(12) United States Patent
Kaszas

(10) Patent No.: US 12,157,810 B1
(45) Date of Patent: Dec. 3, 2024

(54) FILLED UNCURED RUBBER COMPOUND FOR LESS LETHAL AMMUNITION AND DRUG-ELUTING ELECTROSPUN FIBER MAT

(71) Applicant: Polyballistics LLC, Bath, OH (US)

(72) Inventor: Gabor Kaszas, Akron, OH (US)

(73) Assignee: Polyballistics LLC, Bath, OH (US)

( * ) Notice: Subject to any disclaimer, the term of this patent is extended or adjusted under 35 U.S.C. 154(b) by 257 days.

(21) Appl. No.: 17/504,706

(22) Filed: Oct. 19, 2021

Related U.S. Application Data

(60) Provisional application No. 63/093,907, filed on Oct. 20, 2020.

(51) Int. Cl.
| | |
|---|---|
| *C08L 23/22* | (2006.01) |
| *C08K 3/04* | (2006.01) |
| *C08K 3/22* | (2006.01) |
| *D01D 5/00* | (2006.01) |
| *F42B 12/72* | (2006.01) |

(52) U.S. Cl.
CPC ............... *C08L 23/22* (2013.01); *C08K 3/04* (2013.01); *C08K 3/22* (2013.01); *D01D 5/0038* (2013.01); *F42B 12/72* (2013.01); *C08K 2003/2296* (2013.01); *D10B 2401/041* (2013.01); *D10B 2509/022* (2013.01)

(58) Field of Classification Search
CPC .. C08L 23/22; C08K 3/04; C08K 3/22; C08K 2003/2296
See application file for complete search history.

(56) References Cited

U.S. PATENT DOCUMENTS

| | | | |
|---|---|---|---|
| 4,946,899 | A | 8/1990 | Kennedy et al. |
| 5,786,419 | A | 7/1998 | Meier-Westhues et al. |
| 6,295,933 | B1 | 10/2001 | Dubocage et al. |
| 6,747,098 | B2 | 6/2004 | Puskas et al. |
| 7,614,349 | B2 | 11/2009 | Puskas et al. |
| 9,790,301 | B2 | 10/2017 | Puskas |

(Continued)

FOREIGN PATENT DOCUMENTS

GB    2192258 B    1/1988

OTHER PUBLICATIONS

Puskas, Kumar, Lamperd, Kaszas and Sandler; Comparison of the Peformance of Vulcanized Rubbers and Elastomer/TPE/Iron Composites for Less Lethal Ammunition Applications; Polym. Eng. Sci., 45:966-975, 2005, published online in Wiley InterScience (www.interscience.wiley.com).

(Continued)

*Primary Examiner* — Jianfeng Song
(74) *Attorney, Agent, or Firm* — Renner, Kenner, Greive, Bobak, Taylor & Weber

(57) ABSTRACT

A composite is provided comprising a polymer matrix including at least one thermoplastic elastomeric polymer (TPE) component, and at least one soft elastomeric polymer component; and a high specific gravity reinforcing filler, and, optionally, carbon black dispersed in the polymer matrix, wherein the composite has a specific gravity of greater than one. The composite is useful in the preparation of: (1) polymeric-based less-lethal ammunition designed to incapacitate the target without inflicting serious or life-threatening injuries; and (2) Drug-eluting electrospun fiber mats for medical applications.

11 Claims, 2 Drawing Sheets

Filler reinforcement in the new compound, in comparison with Fe as a non-reinforcing filler.

(56) References Cited

U.S. PATENT DOCUMENTS

| | | | |
|---|---|---|---|
| 2007/0017160 A1* | 1/2007 | Caldwell | B24D 3/34 |
| | | | 51/307 |
| 2007/0234891 A1* | 10/2007 | Puskas | C08L 23/20 |
| | | | 525/90 |
| 2014/0255722 A1* | 9/2014 | Nagarajan | C23C 18/1653 |
| | | | 428/626 |

OTHER PUBLICATIONS

Antony, Kwon, Puskas, Kovar and Norton; Atomic force microscopic studies of novel arborescent block and linear triblock polystyrene-polyisobutylene copolymers; European Polymer Journal 40 (2004) 149-157.

Puskas, Kumar, and Lamperd; Novel Butyl Composite for Less-Lethal Ammunition; paper 126 give at the 164th Technical Meeting, ACS Rubber Division, Oct. 14-17, Cleveland, Ohio, 2003.

* cited by examiner

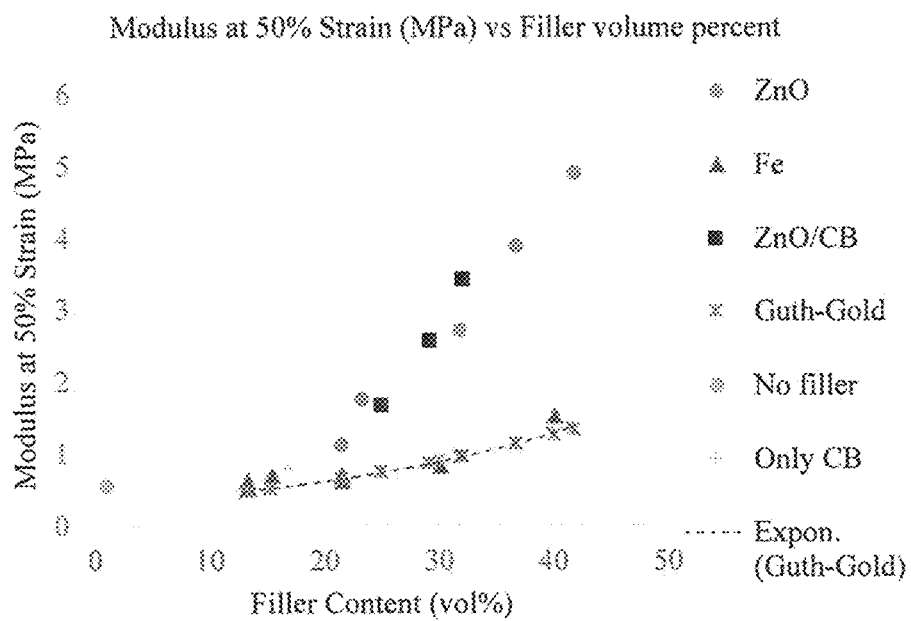
Figure 1. Filler reinforcement in the new compound, in comparison with Fe as a non-reinforcing filler.

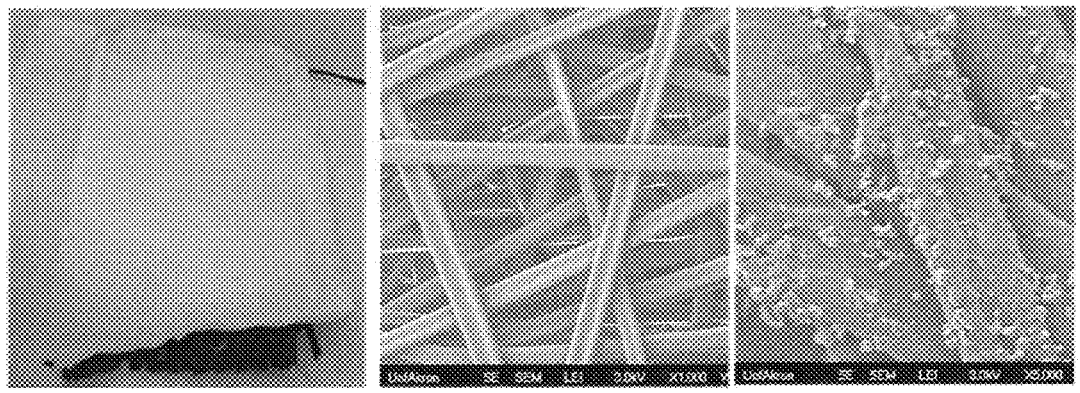
Figure 2. Electrospun fiber mat (left), SEM image (middle) and after drug release (right).

FILLED UNCURED RUBBER COMPOUND FOR LESS LETHAL AMMUNITION AND DRUG-ELUTING ELECTROSPUN FIBER MAT

FIELD OF THE INVENTION

The present invention relates to a composite material that includes a thermoplastic elastomer-elastomer blend and reinforcing filler(s). The composite is useful in the preparation of: (1) polymeric-based less-lethal ammunition designed to incapacitate the target without inflicting serious or life-threatening injuries; and (2) Drug-eluting electrospun fiber mats for medical applications.

SUMMARY OF THE INVENTION

It is an object of the present invention is to provide a low toxicity, low cost, high-density replacement reinforced composite material for developing novel less-lethal ammunition projectiles and drug-eluting electrospun fiber mats of various density. In one or more embodiments, this can be achieved by using a compacted mixture of zinc oxide (ZnO), thermoplastic elastomeric block copolymer (SIBS) and butyl elastomer (IIR). ZnO having a specific gravity of 5.6 grams per cubic centimeter (g/cm3) cannot be matched with equivalent reinforcing fillers available at an affordable cost. The choice of this composite is the most economic approach to generate a replacement material to unfilled rubber or lead filled less-lethal ammunition currently available. This replacement material provides added value, such as significantly less toxicity and pollution, is recyclable and has antibacterial and wound-healing properties. Optionally a small amount of carbon black (<10 wt %) can be added to reduce the tack of the compound for less-lethal ammunition and improve conductivity and biocompatibility for drug-eluting fiber mats.

In one or more embodiments, the present invention provides a composite material made of a thermoplastic elastomer, a butyl elastomer and one or more reinforcing fillers, which is molded into a less lethal ammunition projectile using conventional polymer processing technology such as compression or injection molding, or novel technologies including but not limited to 3D printing, or electrospun into fiber mats. The composition disclosed herein provides a highly damping polymer matrix, which is conducive to its use as a less-lethal projectile. It also has antibacterial and wound-healing properties, which is conductive to its use in biomedical applications such as bandages.

It is an objective of the present invention to provide a low toxicity, low cost, high-density reinforced replacement material for presently used less lethal projectile ammunition. In one or more embodiments, this can be achieved by using a compacted mixture of Zn and of a blend of a TPE and an elastomer, optionally with carbon black. This replacement material provides added value, such as significantly less toxicity or pollutant and better shape retention. Since the elastomer phase is not chemically crosslinked, the composite can be recycled, but keeps its shape due to the presence of TPE and the reinforcing filler(s).

The present invention also provides a composite comprising (i) a polymer matrix that includes at least one thermoplastic elastomeric polymer (TPE) component, and at least one soft elastomeric polymer component; and (ii) particles of a high specific gravity reinforcing material are dispersed in the polymer matrix having a density and present in an amount such that the composite has a specific gravity of greater than one, preferably greater than one point five. In one or more embodiments, a small amount (<10 wt %) of carbon black is added to reduce the tack of the compound and increase its conductivity. In one or more embodiments, the composites thus prepared are subjected to a molding process, by which shapes with improved aerodynamics can be obtained from the said composite, e.g. projectiles for firearms, etc. In one or more embodiments, the composites are subjected to electrospinning to produce fiber mats.

One or more embodiments of the present invention also provide a filled uncured rubber compound. The high-density version is suitable for the manufacture of less-lethal ammunition with high accuracy, while the low-density version is suitable for the manufacture of electrospun drug eluting fiber mats for wound healing applications. In one or more embodiments, the rubber compound includes a compact mixture of a reinforcing filler such as zinc oxide, optionally a small amount of carbon black, a highly damping, inert, non-toxic elastomer and an inert non-toxic thermoplastic elastomer. In one or more embodiments, the materials are first blended, then bullets re injection molded, compression molded or 3D printed, or the blend is mixed with a suitable drug and electrospun into fiber mats. In one or more embodiments, the density of the composite ammunition projectile material is adjustable in terms of the ratio of ZnO filler to elastomer to thermoplastic elastomer.

BRIEF DESCRIPTION OF DRAWINGS

The following is a description, by way of example only, reference being had to the accompanying drawings, in which:

FIG. 1 is a graphical representation of the effect of filler reinforcement on Modulus at 50% Strain.

FIG. 2 is a photographic representation of electrospun fiber mat (left), SEM image (middle), and after drug release (right).

DESCRIPTION

Terminology

As used herein, the terms "comprises", "comprising", "including" and "includes" are to be construed as being inclusive and open ended, and not exclusive. Specifically, when used in this specification including claims, the terms "comprises", "comprising", "including" and "includes" and variations thereof mean the specified features, steps or components are included. These terms are not to be interpreted to exclude the presence of other features, steps or components.

As used herein, the term "soft elastomeric material" or "soft elastomer" means a polymer that at ambient temperatures is above its glass transition temperature. In other words, this material is one which at ambient temperatures is a viscoelastic material having an amorphous structure. It is this component of the polymer matrix that is primarily responsible for the softness and high damping characteristics of the final compound.

As used herein, the term "thermoplastic elastomer" (TPE) means a polymer that at ambient temperatures exhibits a suitable degree of resilience, hardness and shape retention that the soft elastomeric polymer component alone lacks. It is the thermoplastic nature of this second polymer component of the matrix of the compound that is primarily responsible for the hardness and/or low compression creep properties of the final composite.

General Description of Composite Material

In one or more embodiments, the composite material of the present invention is a blend of a soft elastomer, a thermoplastic elastomer (which together are sometimes referred to herein as a polymer matrix) and a reinforcing filler.

Selection of optimum components for the polymer matrix may depend upon the exact mechanical properties required of it, which may depend to at least some extent on the amount of each to be incorporated in the polymer matrix and the relative physical properties of the elastomeric polymer component, and possibly any other components of the composite which are present, including the high specific gravity weight reinforcing filler and carbon black.

In general, the polymer matrix of the composite of this invention comprises at least one soft elastomeric polymer component and at least one TPE polymer component.

Any type of commercial butyl elastomer can be used as the soft elastomeric component of the composite in the present invention. Suitable polymers for use in the invention as the soft elastomeric polymer component include polyisobutylene, polyisobutylene-isoprene copolymers, polyisobutylene-styrene copolymers, polyisobutylene-alkyl styrene copolymers, halogenated polyisobutylene-alkyl styrene terpolymers, polybutadiene, polyisoprene, polyethylene-propylene copolymers, polyethylene-propylene diene terpolymers. In one or more embodiments, the soft elastomeric polymer is selected from polyisobutylene, and polyisobutylene-isoprene (IIR) copolymers.

In one or more embodiments, materials are selected that will yield the desired mechanical properties. IIR, sometimes referred to as butyl elastomer or butyl rubber, has outstanding low temperature properties and very high damping, but has very high creep without crosslinking (J. V. Fusco and P. House, in "Rubber Technology," M. Morton, Ed., Van Nostrand Reinhold Company, New York (1987). TPEs, including SIBS, show processing behavior similar to that of thermoplastics and mechanical properties similar to that of thermoset elastomers or rubbers. Therefore they combine the advantages of low fabrication cost and recyclability with elasticity and softness (G. Holden and N. R. Legge, in "Thermoplastic Elastomers-A Comprehensive Review," G. Holden, N. R. Legge, R. Quirk, H. E. Schroeder (Eds.), Hanser Publishers, Munich (1996)).

Preferred TPE polymers for use in the polymer matrix are block copolymers comprising at least one amorphous elastomeric unit species. Examples of block copolymers of this type include polystyrene-polybutylene block copolymer, polystyrene-polyethylene block copolymer, polystyrene-polybutadiene block copolymer, polystyrene-polyisoprene block copolymer, polystyrene-polyisobutylene and polyalloocimene-polyisobutylene.

Linear triblock SIBS TPEs were introduced commercially in 2003 by Kaneka Co. of Japan, based on a license of U.S. Pat. No. 4,946,899, from the University of Akron. Star-branched SIBS is considered the second generation, with improved properties. The third generation, arborescent (dendritic, tree-like) SIBS TPEs were introduced in 2002 (J. E. Puskas, P. Antony, C. Paulo U.S. Pat. No. 6,747,098 (2004). Initial investigations of the mechanical and viscoelastic properties of these materials indicated superior properties (P. Antony, Y. Kwon, J. E. Puskas, M. Kovar, P. R. Norton, EUR. POLYM. J., in press (2003)). The fourth generation PIB-based TPE (poly(alloocimene-isobutylene-alloocimene) or AIBA for short) received patent protection in 2017 (U.S. Pat. No. 9,790,301). While the second, third and fourth generations have not been commercialized yet, they are all potential materials for the TPE component of the present invention. The exceptional low temperature properties of these block copolymers together with case of processing and recyclability make them suitable candidates for low temperature applications. All of these SIBS-type TPEs can serve as "physical crosslinking agents" of the butyl (IIR) elastomer matrix of the current invention.

Preferably, the rigid TPE component should be fusible, in order that it may be readily blended with the other polymer component or components of the composite and with the high specific gravity weight material and optional carbon black to be dispersed within the matrix of bi-component polymer matrix. Polymers of this type are commercially available, for example as the KRATON (trade mark) series of polymers from Shell Chemical Company (for example the KRATON D and KRATON G ranges of polymers) and the Kaneka trade mark) series of polymers (e.g. Kaneka SIBS 73T and Kaneka SIBS 103T) from Kaneka Corporation, Osaka, Japan.

The high specific gravity reinforcing filler is present in the composite of the invention in particulate form and may be added to the polymer matrix during manufacture in the form of a powder or grains thereof. Within the above preferred criteria, therefore, any particulate high specific gravity material may be used as this component of the composite of the invention. One example of such a material which has been found to be useful in the invention is ZnO, which is non-toxic and itself has a high specific gravity.

Generally speaking, the particulate high-density weight material will be present in an amount only sufficient for raising the density of the composite to the required value, and no more than this. In one or more embodiments, the density of the final composite of is from about 1.5 to 2.5 g/cm3, in other embodiments, about 2.3 g/cm3.

In one or more embodiments, the high density weight material may be present in the composite in an amount of from about 10 to about 60% by volume of the total composite, in other embodiments, from about 15 to about 40% by volume, in other embodiments, from about 20 to about 30% by volume, based upon the total volume of the composite.

The present invention is partially based on the discovery that iron (see WASP) does not reinforce the composite while ZnO is a strong reinforcing agent. Thus, in one or more embodiments, the SIBS content may be reduced, reducing the cost of manufacturing.

In one or more embodiments, the composite comprises a small amount of carbon black. The addition of a small amount of carbon black is advantageous because it reduces the tack of the composite.

In one or more embodiments, the carbon black is present in an amount of up to 10 wt %, based upon the total weight of the composite, in other embodiments, up to about 7.5 wt. %, and in other embodiments, up to about 5 wt. %, based upon the total weight of the composite. In one or more embodiments, the carbon black is present in an amount of from zero to about 10 wt %, based upon the total weight of the composite, in other embodiments, from about 1 to about 7.5 wt. %, and in other embodiments, from about 2 to about 5 wt. %, based upon the total weight of the composite.

Advantageously, the content of the soft elastomer and TPE may be selected to achieve a favorable balance of physical properties, in order to achieve optimum hardness, strength, compression creep.

In one or more embodiments, the polymer matrix of the composite of the invention comprises the soft elastomeric polymer component in an amount within the range from about 25 to about 90 by volume of the polymer matrix, in other embodiments, from about 30 to about 50% by volume. In one or more embodiments, the polymer matrix of the composite of the invention comprises the TPE polymer component in an amount within the range from about 25 to about 90% by volume, in other embodiments, from about 30 to about 50% by volume.

The composite of the present invention may be manufactured by conventional methods well known in polymer technology, as are well known to the person skilled in the art and well described in the literature. For example, the rigid thermoplastic elastomeric polymer and soft elastomeric polymer components, and the fillers are combined in a standard type of mixer until a completely homogeneous matrix is formed, optionally with further heating if necessary. The composite may be cooled and passed to the next processing stage In one or more embodiments, the composite is formed into pellets or other discrete bodies by molding.

Advantageously, the present invention a bi-component polymer matrix with a reinforcing filler that provides the composite with desirable balance of physical properties, notably hardness and compression creep and high damping property combination with required high density for less-lethal applications, and spinnability, anti-bacterial and wound-healing properties, and the ability to encapsulate and release drugs from the fiber mat.

Less-Lethal Ammunition.

In many types of confrontation situations, the use of lethal ammunition is not appropriate. More and more law enforcement and military authorities are seeking ways to reduce casualties in confrontation situations, particularly crowd control and in hostage situations, which are handled by special task forces, e.g. SWAT teams and air marshals. Different available less-lethal devices have been evaluated and categorized in terms of their effectiveness and potential in the context of law enforcement ("Less Lethal Technologies-Initial Prioritization and Evaluation," by T. Donnelley, Home Office, PSDB No 12/01, Police Scientific Development Branch, Hertfordshire, United Kingdom (2002)". In this report, the impact type of less-lethal ammunition projectiles were placed in Category A, i.e. those devices meriting immediate further research. Examples of less-lethal ammunition projectiles given were bean bags, sock rounds, single and multiple ball rounds, fin stabilized rubber projectiles, single and multiple baton rounds and encapsulated rounds.

Fin stabilized round nose rubber projectiles (referred to as the Rocket) are made of thermoset elastomers, for example EPDM (Ethylene-Propylene-Diene rubber). U.S. Pat. No. 7,614,349, incorporated herein by reference, describes a sample that was made of filled thermoset EPDM and was measured to have a density of 2.44 g/cm$^3$ and Shore A Hardness (ASTM D2240) of 62. These projectiles are generally fired from a 12-gauge shotgun or compressed gas weapon and the typical range is up to 45 feet. Drawbacks associated with these types of projectiles are their high fabrication cost and very small tolerances in the design dimensions. In addition, under cold climatic conditions (<0° C.) the material properties of these projectiles change, becoming hard, and as a result can be lethal if for example they hit a person in the head or temple.

Another type of less-lethal ammunition, lead filled rubber projectiles (Tube), consist of a cylindrical envelope made of thermoset elastomers, for example EPDM or SBR (styrene-butadiene rubber). The core of the projectile is filled with lead pellets. The tail is attached to the projectile for stabilization, which improves its accuracy. U.S. Pat. No. 7,614,349 describes a sample that was made of filled SBR and was measured to have a density of about 1.2 g/cm$^3$, and Shore A hardness of 62. These projectiles are generally fired from a 12-gauge weapon and the typical range is 5-30 feet, depending on the model and type of weapon used. Drawbacks associated with these types of projectiles are their high fabrication cost, presence of lead and their 'lethality' under cold climatic conditions.

Another type of non-lethal ammunition, mono-ball rounds, consist of single rubber balls which are delivered over a short range. They are made of thermoset elastomers, e.g., natural rubber, filled with mineral fillers, e.g., calcium carbonate. One specific example in U.S. Pat. No. 7,614,349 was made of filled thermoset polyisoprene (synthetic or natural) and was measured to have a density of 1.11 g/cm$^3$ and Shore A Hardness of 46. Drawbacks associated with these projectiles include little or no accuracy. These projectiles are generally fired from a 37 mm (1.54 in) diameter weapon, which most police and military personnel find cumbersome to carry around.

Multi-ball rounds are another type of less-lethal impact projectile which include multiple rubber balls delivered over a short range as these projectiles quickly lose their kinetic energy owing to their low mass. They are made of thermoset elastomers, e.g., natural rubber or SBR, filled with minerals, e.g., calcium carbonate or carbon black. One specific example in U.S. Pat. No. 7,614,349 was made of filled thermoset EPDM and was measured to have a density of 1.1 g/cm3, and Shore A hardness of 62. These projectiles are generally fired from a 12-gauge weapon, but other calibers may also be found. The range of these projectiles depends on the diameter and number of balls, the caliber of the projectiles and the amount of propellant. Drawbacks associated with these projectiles is that like single ball rounds, these projectiles are indiscriminate hence have little or no accuracy.

Beanbag rounds are another type of less-lethal ammunition which consists of a square or circular envelope of fabric containing lead shots. The beanbag is generally fired from a 12-gauge weapon and flattens on impact, thereby spreading the energy over a large area. The typical range is 5-30 feet, depending on the model and type weapon used. For example, a 12-gauge round contains two 2-inch beanbags, each filled with 20 grams of #9 Lead. A few shortcomings associated with beanbag projectiles include inaccuracy, failure to open up and hitting the target edge on (i.e., "Frisbee effect"). In addition, the fabric may tear, causing environmentally toxic lead pellets to spill over the target and causing serious injuries. These are the most widely used less-lethal impact projectiles in North America and are associated with a few fatal incidents.

Sock rounds, another type of less-lethal impact projectile, were developed to overcome the shortcomings associated with beam bag rounds. The sock round consists of a "sock" filled with lead pellets. A long fabric tail is attached to the sock to enhance the stability of the projectile during flight. The problems associated with sock rounds are inaccuracy, tear of fabric and presence of environmentally toxic lead.

Powder filled rounds are less-lethal impact projectiles made of very soft, highly pliant silicon elastomers filled with metal powder. These projectiles expand radially upon impact thereby spreading their kinetic energy over a large area. The problem associated with these rounds is high cost and inaccuracy.

Another type of less lethal ammunition is baton rounds which were first used by the police in Northern Ireland in 1973 and have steadily evolved over the years. They are made of polyurethane-based thermoplastics and have oIRHD (ASTM D1415) hardness in the range of 85 to 95 and mass in the range of 90 to 100 g. The most common commercially available rounds are L5A7 and L21A1.

One of the major concerns for law-enforcement agencies in using these less-lethal ammunition projectiles is the delicate balance between their effectiveness and their lethality. For example, the sock rounds, (i.e., fabric filled with lead pellets) and rubber projectiles (i.e., solid or filled with lead pellets) which are presently being used for crowd control, have been found to be lethal within a short range or causing serious injuries to vital organs. The fabric or thermoset elastomer used for the manufacture of these less-lethal projectiles require intricate design and fabrication, which enhances their cost. In addition, the presence of environmentally toxic lead results in serious health safety concerns among law enforcement agencies. Literature survey revealed that less lethal ammunition presently being used are either made of thermoplastics or thermoset based carbon black/calcium carbonate filled composites. They reportedly are capable of inflicting lethal injuries when shot from a short distance or when shot at a vital organ (R. I. H. Whitlock and J. M. Gorman, Int. J. Oral Surg. 7, 240-245 (1978)).

U.S. Pat. No. 7,614,349 (2009) disclosed a new less-lethal ammunition projectile (WASP) made of a blend of a thermoplastic rubber and an elastomer filled with iron powder. WASP claimed better accuracy and less impact energy than competitive products but is not widely used in the USA. The design of WASP was based on the research of Cynthia A Bir of Wayne State University, Michigan (Evaluation of Blunt ballistic impacts: The establishment of human response corridors. Bir C A; Vino D C; King A I, Proceedings of the Non-lethal Conference IV, Tysons Corner, VA (2000); Ph. D. Thesis, 2000). She has analyzed the effect of blunt ballistic impact on the thoracic region using human cadavers. She determined the human response corridors and developed biomechanical surrogates, which can be used for testing a variety of new projectiles for their blunt ballistic impact. In addition, a 3-Rib Ballistic Impact Device (3-RBID) was developed to simulate the human response to low mass, high velocity impacts to the chest region. The human response force corridor for blunt thoracic impact for a 30 g projectile traveling at 60 m/s (~200 ft/s) was found to be in the range of 1800 N to 3800 N (400 lbf to 830 lbf). In U.S. Pat. No. 7,614,349, the optimum weight and impact energy requirements were applied for designing WASP. For flight stabilization a tail was included. In addition, U.S. Pat. No. 7,614, 349 (2009) also presented a new method using a viscoelastic material, namely polystyrene foam (Styrofoam Impactor), to measure the impact energy of new and existing less lethal projectiles. Traditionally clay or gel are used to measure the impact energy of lethal projectiles. These are also viscoelastic materials but are very sensitive to environmental conditions such as moisture level and temperature so need to be conditioned before use. The traditional ballistic gel method has been adopted to test less-lethal ammunition as well but due to the low impact force of less lethal projectiles it is a pass-fail test only and is not very satisfactory for quantitative testing.

Conventional less-lethal ammunition are characterized by the use of fillers such as carbon black, calcium carbonate, iron powder, consolidated into a bullet having sufficient density for use in less-lethal ammunition. For example, Patent Application GB 2,192,258 discloses a less-lethal round comprising a projectile made of synthetic polyisoprene. Patent Application FR 2,532,742 discloses projectiles formed of an unspecified rubber bullet having a Shore A hardness of 40 to 55. Projectiles made of filled thermoplastic elastomers (TPEs such as ethylene-propylene copolymer, styrene-isoprene-styrene SIS or styrene-butadiene-styrene SBS type) have been disclosed (J. C. Gardner, P. G. Gardner, I. P. Oliver and T. Peake, U.S. Pat. No. 5,786,419, Jul. 28, 1998, B. Dubocage and J. Mautcourt (to SNPE Paris Cedex), U.S. Pat. No. 6,295,933 B1, Oct. 2, 2001). U.S. Pat. No. 7,614,349 (2009) disclosed a blend of uncured butyl elastomer, a poly(styrene-isobutylene-styrene) TPE (SIBS) and iron powder in a ratio of 50:50:223 by weight. All the composites mentioned above are based on either filled thermoset elastomers or filled thermoplastic elastomers; the fillers may include carbon black, calcium carbonate, metal powder or other minerals.

One important design criterion for the less lethal projectiles is the maximum tolerable energy or force per unit area that an average human could withstand without serious injury. This is highly individual as it generally depends on the individual's body fat and muscle mass. Bir's study considered the average male (about 5 ft 10 in, 160 lb). Based on her results, the tolerable energy transfer at muzzle is 73 J (54 ft lb) for the 12-gauge projectile. The maximum tolerable force transfer on impact without serious injury is limited to 3200 N (26 J). With the desirable 76 m/s (250 ft/s) muzzle velocity, this translates into about 25 g weight for the 12-gauge projectiles. Thus the minimum density of the WASP projectiles with iron filler was calculated to be 2.4 g/cm$^3$.

Advantageously, the composite of the present invention has reduced density/weight with more propellant.

When designing the new projectiles, several considerations should be taken into account. There are optimum material density requirements for any bullet, lethal or less-lethal. In addition, the propellant powders are intended to work with a projectile of a certain mass that provides a typical pressure vs. time correlation and delivers impact energy within the acceptable range established by Bir et al. They employed the Abbreviated Injury Score (AIS), a scale developed in the 1960s to standardize the severity of injuries such as blunt thoracic impact. An AIS value of 0 is equivalent to a minor injury and 6 is equivalent to untreatable injury. It was noted, however, that injuries with an AIS of 3 or larger result in a high probability of death. For example, an injury of lung contusion with internal hemorrhage in the thorax region is considered an AIS 4 injury. This scale was used to evaluate the injuries caused by 37 mm ammunitions. Therefore it is very advantageous to provide a less lethal projective using a composite material which meets the impact energy requirements, can be processed using conventional polymer processing technology and which can be reused or recycled, without the need of a separate flight-stabilizing tail that needs to be assembled to the projectile after processing such as injection molding.

The invention is not limited to any specific size of shotgun gauge and/or caliber, nor is it limited to shotgun-type weapons. It can be applied to any firearm as well as any weapon regardless of propulsion method.

Drug-Eluting Electrospun Fiber Mats

In one or more embodiments, electrospinning techniques may be employed to produce fibers in the range of microns to nanometers, from polymer solutions, using electrostatic forces. In one or more embodiments, the fibers have small pores and high surface area. In one or more embodiments, the fibers have application in the biomedical industry, due to the case of fabrication of fibers from a wide array of polymers-biodegradable, non-degradable, synthetic, natural, or their blends. In one or more embodiments, synthetic biocompatible polymers may be spun into fiber mats to make stretchable wound dressings, flexible scaffolds for cell growth and tissue engineering, and implantable membranes/coatings with the capability of controlled drug delivery.

Elastomers, which have the elasticity of natural rubber, are durable and tough. However, particularly elastomers having low glass transition temperatures can be difficult to electrospin into stable nanofibers. Also, the electrospun fibers on the collector may fuse quickly into large fibers or sometimes even a continuous film. Electrospinning of TPEs is advantageous because TPEs can be processed as plastics but exhibit elastomeric properties. In one or more embodiments, electrospinning produces ultrafine fibers.

TPEs that are suitable for electrospinning include poly (styrene-b-butadiene-b-styrene) (SBS) TPE. In one or more embodiments, SBS TPE may be electrospun into hydrophobic fiber membranes with a contact angle of about 132° and tensile strength of about 0.525 MPa, with about 345% elongation at break. In one or more embodiments, the mechanical strength of the membrane may be lower than that of the bulk material (SBS) because of the higher porosity of the fibrous membrane. In one or more embodiments, the fibers are not orderly arranged in the non-woven membrane, and only a small portion of the fibers resist applied mechanical loading, which causes less chain entanglements per unit mass of the porous membrane.

TPEs that are suitable for electrospinning also include poly(styrene-b-isoprene-b-styrene) TPEs. In one or more embodiments, fibers may be produced in the range of 2.7-16 μm diameter. The relatively large size may be due to the possibility that TPE molecules stretch while flowing through a restricted channel of the nozzle and after leaving recoiling occurs very fast, which could prevent Coulombic stretching to decrease the fiber diameter.

TPEs that are suitable for electrospinning also include poly(styrene-b-(ethylene-co-1-butene)-b-styrene) triblock copolymer (SEBS). In one or more embodiments, SEBS fibers may be electrospun, where the fibers have a diameter of about 6 μm.

TPEs that are suitable for electrospinning also include polyisobutylene (PIB) TPEs. For example, a linear poly (styrene-b-isobutylene-b-styrene) triblock copolymer (L_SIBS) is a TPE that has been used in clinical practice as a polymer matrix of a drug-eluting coating on the TAXUS coronary stent. Over 6 million patients have benefited from this device, emphasizing the significance of PIB-based biomaterials. Due to the unique low permeability of L_SIBS, sustained drug delivery is achieved, but only approximately 10% of the encapsulated drug, Taxol, elutes from the coating, which is therapeutic for this application.

Another suitable TPE, Arbomatrix, comprises a branched (arborescent or dendritic) PIB core and end blocks of poly(p-methylstyrene) (PMS). Arbomatrix and its carbon composite is bioinert in a rabbit model. ElectroNanospray, a technology of generating high velocity spray of nanoparticles, can be used to coat Arbomatrix polymers loaded with Dexamethasone (DXM), a model drug, onto coronary stents. This particulate coating does not have an initial burst release but exhibits slow continuous release over time (20-40% release in 28 days). In one or more embodiments, L_SIBS and Arbomatrix may be electrospun onto aluminum stubs. In one or more embodiments, self-supporting fiber mats may be produced by electrospinning a mixture of Arbomatrix and low molecular weight poly(ethylene glycol) (PEG). In one or more embodiments, the ratio of Arbomatrix to PEG is about 80/20 wt/wt based. In certain embodiments, these fiber mats are highly water-repellent, with Water Contact Angles (WCA) great than about 1200. In one or more embodiments, a model drug such as Zafirlukast may be encapsulated into the fibers, with greater than 90% release. In one or more embodiments, the mean fiber size for Zafirlukast-loaded Arbomatrix/PEG fibers is relatively large (4.197 (±0.580) μm).

In one or more embodiments, a poly(lactic-co-glycolic acid) polymer coating may be employed with a similar drug for reducing the capsular contracture (an inflammatory response around silicone rubber breast prostheses) in vivo.

Another suitable TPE, is linear PIB-based TPE, poly (alloocimene-b-isobutylene-b-alloocimene) or AIBA for short. It is also a triblock copolymer like L_SIBS but contains polyalloocimene hard blocks instead of polystyrene. It is synthesized by the carbocationic copolymerization of isobutylene (IB) with alloocimene (Allo). AIBA is easier to synthesize than Arbomatrix and it has higher tensile strength (15 MPa and 600% elongation at break) than Arbomatrix (5.6 MPa and 290% elongation at break). Electrospinning of non-polar and highly non-conductive materials such as AIBA is a challenge, because the process employs high voltage to electrically charge the polymer jets to produce ultrafine fibers. Therefore, the polymer may be mixed with PEG to enhance the electrical conductivity in order to produce self-supporting fiber mats. AIBA is a candidate for drug delivery systems. Although AIBA is a highly hydrophobic material that is non-polar and therefore has high electric resistivity, fiber mats with a proper morphology may still be successfully obtained. PEG may be fully embedded into the electrospun fibers. In one or more embodiments, the tensile strength measured on microdumbbells is about 2.7 MPa at 537% elongation that is comparable to that of soft human tissues. In one or more embodiments, these rubbery fiber mats are highly hydrophobic and cell culture studies showed their non-cytotoxicity.

Nano-structured thermoplastic elastomers (TPEs) are emerging materials in the field of polymer science. These materials show processing behavior similar to that of thermoplastics and mechanical properties similar to that of thermoset elastomers or rubbers. Therefore, they combine advantages of low fabrication cost and recyclability of thermoplastics, and low hardness, elasticity and shape retention (low creep) of thermoset elastomers. U.S. Pat. No. 7,614,349 (2009) demonstrated that Polyisobutylene (PIB)-based TPEs such as SIBS with their inherent high damping properties are eminently suitable for developing a composite for novel less lethal projectiles. Moreover, the exceptionally low temperature properties of these block copolymers together with ease of processing and recyclability, makes them suitable candidates.

In one or more embodiments, the composite is electrospun.

The current invention provides a method for the electrospinning of the composite of the present invention, for wound healing and/or drug eluting applications. Zinc oxide itself has wound healing and antibacterial properties so it is advantageous for wound healing applications. It also imparts UV stability to the mats. The addition of carbon is advantageous because it increases conductivity and biocompatibility. It also makes the mats black that may be advantageous in a combat situation. Drugs (e.g., antibiotics, pain killers) can easily encapsulated into the fibers during the spinning process. Release profiles can be controlled by loading and configuration of the fibers.

The present invention will be further illustrated by the following examples, which are not to be construed as limiting the scope of the present invention in any way.

Example 1. Compound Comparison 1.1. Mixing

SIBSTAR was obtained from Kaneka Co. of Japan. Butyl rubber (IIR) was obtained from ExxonMobil. Both have a density of 0.92 g/cm3. The density of ZnO is 5.6 g/cm3 and that of carbon black is 1.8 g/cm3. 3 wt % carbon black was added to aid processability of the compound and reduce stickiness. The compounds were prepared in a Branbender Mixer with REE6 Mixing Bowl, Sigma, Banbury, Roller and CAM Blades. The density of the composite was calculated to be 2.3 g/cm3.

1.2 Compression Molding:

Sheets were compression molded in the lab. The compound was warmed at 248 F for 8 minutes at 3000 lbs force and pressed at 11250 lbs for 3 minutes after.

1.3. Shore A Hardness

The Shore A hardness of the composite was 65.

1.4 Tensile Measurements:

Specimens for tensile analysis were cut with a die (length 45 mm, neck width 3 mm, and thickness 1 mm). Tensile measurements were taken on an Instron at a crosshead speed of 500 mm/min.

FIG. 1 plots tensile data against filler volume % at low strain. It can be seen that iron (Fe) is a non-reinforcing filler, while ZnO strongly reinforces the polymer blend. The Guth-Gold equation matches the Fe plot, also indicating no filler reinforcement with Fe.

Example 2

A comparative impact energy testing of the new less lethal ammunition projectile with WASP purchased in 2017 was carried out. A 12-gauge 870 Remington shotgun (smooth barrel) was used from a firing distance of 30 ft. Table 1 summarizes the results, together with data published earlier. The purchased WASP and the new projectile had similar impact energy data, and all values were below 50% of the impact energy range established by Bir. It should be noted that the purchased WASP and the new projectile were lighter at 18 and 16 g than published in the literature. According to earlier reports, a 24 g 12-gauge new less-lethal projectile had 12.3±3 J impact energy when fired from approximately 30 ft distance. The most frequently used sock round had 22.8±2 J impact energy, very close to the upper limit from Bir.

TABLE 1

Impact energy comparison.

| | Impact Energy (J) | | Published | |
|---|---|---|---|---|
| | WASP 2017 | New | WASP | Sock |
| | 5.7 | 6.3 | | |
| | 6.4 | 6.0 | | |
| | 3.0 | 9.5 | | |
| Avg | 5.0 | 7.3 | 12.3 ± 3 | 22.8 ± 2 |

Example 3

A compound with 10 wt % ZnO was successfully electrospun to yield a mat with 295.5 g/m2.

Example 4

A compound with 10 wt % ZnO was successfully electrospun to yield a mat with 203.8 g/m2.

Example 5

A compound with 20 wt % ZnO was successfully electrospun to yield a mat with 107.0 g/m2.

Example 6

A compound with 20 wt % ZnO was successfully electrospun to yield a mat with 105.0 g/m2.

Example 7

A compound with 20 wt % ZnO was successfully electrospun to yield a mat with 113.0 g/m2.

Example 8

A compound with 20 wt % ZnO was successfully electrospun to yield a mat with 90.0 g/m2.

In one or more embodiments the composite comprises SIBS/IIR 50/50 compound with 21.5 v % ZnO reinforcing filler and 5% carbon black, and is injection molded.

In one or more embodiments the composite comprises SIBS/IIR 50/50 compound with 5 wt % ZnO reinforcing filler, dissolved in a suitable solvent and electrospun.

In one or more embodiments the composite comprises SIBS/IIR 50/50 compound with 5 wt % ZnO reinforcing filler, dissolved in a suitable solvent, mixed with suitable drugs and is electrospun.

In one or more embodiments the composite comprises SIBS/IIR 50/50 compound with 5 wt % ZnO reinforcing filler, 5 wt % carbon black, dissolved in a suitable solvent and is electrospun.

In one or more embodiments the composite comprises SIBS/IIR 50/50 compound with 5 wt % ZnO reinforcing filler, 5 wt % carbon black, dissolved in a suitable solvent, mixed with suitable drugs and is electrospun.

In light of the foregoing, it should thus be evident that a composite is described herein, and that the composite substantially improves the art and otherwise accomplishes the objects of the present invention. Various modifications and alterations that do not depart from the scope and spirit of this invention will become apparent to those skilled in the art. This invention is not to be duly limited to the illustrative embodiments set forth herein.

What is claimed is:

1. A composite comprising:
a polymer matrix including at least one thermoplastic elastomeric polymer (TPE) component that is selected from the group consisting of polystyrene-polybutylene block copolymer, polystyrene-polyethylene block copolymer, polystyrene-polybutadiene block copolymer, polystyrene-polyisoprene block copolymer, and polystyrene-polyisobutylene, poly(styrene-block-isobutylene-block-styrene) (SIBS) linear triblock polymer, star-branched SIBS polymers, arborescent SIBS polymers, poly(alloocimene-isobutylene-alloocimene) polymers, and polyalloocimene-polyisobutylene, and at least one soft elastomeric polymer component that is selected from the group consisting of polyisobutylene, polyisobutylene-isoprene copolymers, polyisobutylene-styrene copolymers, polyisobutylene-alkyl styrene copolymers, halogenated polyisobutylene-alkyl styrene terpolymers, polybutadiene, polyisoprene, polyethylene-propylene copolymers, and polyethylene-propylene diene terpolymers; a high specific gravity reinforcing filler that is zinc oxide, and carbon black dispersed in the polymer matrix, wherein the composite has a specific gravity of greater than one.

2. The composite according to claim 1, subjected to a molding process, by which projectiles with specified aerodynamic shape are produced from the said composite.

3. The composite according to claim 1, dissolved in a suitable solvent and subjected to an electrospinning process to produce a fiber mat for wound healing applications.

4. The composite according to claim 1, dissolved in a suitable solvent and mixed with one or more drugs, and subjected to an electrospinning process to produce a drug eluting fiber mat for wound healing applications.

5. The composite of claim 1, wherein the composite has non-toxic, antibacterial and wound-healing properties.

6. The composite of claim 1, wherein the composite has a specific gravity of greater than 1.5.

7. The composite of claim 1, wherein the amount of carbon black is less than 10 weight percent, based upon the total weight of the composite.

8. The composite of claim 1, wherein the soft elastomeric polymer component is selected from the group consisting of polyisobutylene, and polyisobutylene-isoprene (IIR) copolymers.

9. The composite of claim 1, wherein the density of the composite is from about 1.5 to about 2.5 g/cm3.

10. The composite of claim 1, wherein the amount of soft elastomeric polymer is from about 25 to about 90% by volume.

11. The composite of claim 1, wherein the amount of high specific gravity reinforcing filler is from about 10 to about 60% by volume.

* * * * *